(12) United States Patent
Howard et al.

(10) Patent No.: US 6,230,153 B1
(45) Date of Patent: May 8, 2001

(54) ASSOCIATION RULE RANKER FOR WEB SITE EMULATION

(75) Inventors: Steven Kenneth Howard, Irving, TX (US); David Charles Martin, San Jose; Mark Earl Paul Plutowski, Santa Cruz, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/099,538

(22) Filed: Jun. 18, 1998

(51) Int. Cl.[7] .................................................. G06F 17/30
(52) U.S. Cl. ................................. 707/2; 707/200; 707/7; 705/5
(58) Field of Search .................................. 707/1–7, 200, 707/205; 705/5, 10

(56) References Cited

U.S. PATENT DOCUMENTS

| | | | |
|---|---|---|---|
| 5,615,341 | 3/1997 | Agrawal et al. | 705/10 |
| 5,668,988 | * 9/1997 | Chen et al. | 707/101 |
| 5,724,573 | * 3/1998 | Agrawal et al. | 707/6 |
| 5,832,482 | * 11/1998 | Yu et al. | 707/6 |
| 6,061,682 | * 5/2000 | Agrawal et al. | 707/6 |

OTHER PUBLICATIONS

Han et al, Discovery Of Multiple Level Association Rules Form Large Databases, Proceedings of the 21st International Conference on Very Large Data Bases, Zurich, Switzerland, Sep. 11–15, 1995, pp. 420–431.

H. Mannila et al, "Improved Methods For Finding Association Rules", Pub. No. C–1993–65, 20 pages, Univ. Helsinki, 1993.

Savascre et al, "An Efficient Algorithm For Mining Association Rules In Large Databases", Proceedings of the 21st VLDB Conference, Zurich, Switzerland, 1995, pp. 432–444.

Srikant et al, "Mining Generalized Association Rules", Proceedings of the 21st VLDB Conference, Zurich, Switzerland, 1995, pp. 407–419.

Ullah, "Entropy, divergence and distance measures with economic applications", *Journal Of Statistical Planning And Interence*, Elsevier 1993, pp. 137–163.

J.S. Park, et al, "Efficient Parallel Data Mining For Association Rules", IBM Research Report, RJ 20156, Aug. 1995.

J.S. Park et al, "An Effective Hash Based Algorithm For Mining Association Rules", Proc. ACM–SIGMOD Conf. On Management of Data, San Jose, May 1994.

Agrawal et al, "Parallel Mining Of Association Rules: Design, Implementation, And Experience", IEEE Transaction On Knowledge Data Engineering, vol. 8, No. 6, pp. 962–969, Dec. 1996.

Argrawal et al, "Fast Algorithms For Mining Association Rules", Proceedings of the 1994 VLDB Conferences, pp. 487–499, 1994.

Agrawal et al, "Mining Association Rules Between Sets of Items In Large Databases", Proc. 1993 ACM SIGMOD Conf. pp. 207–216, 1993.

Piatetsky–Shapiro, Chapter 13 "Discovery, Analysis, And Presentation Of Strong Rules", from *Knowledge Discovery in Databases*, pp. 229–248, AAAI/MIT,Press, Menlo Park, Ca 1991.

Swami, "Research Report: Set–Oriented Mining For Association Rules", IBM Research Division, RJ 9567 (83573 Oct. 1993.

\* cited by examiner

*Primary Examiner*—Hosain T. Alam
*Assistant Examiner*—Jean Bolte Fleurantin
(74) *Attorney, Agent, or Firm*—Gray Cary Ware & Freidenrich LLP

(57) ABSTRACT

A method and apparatus that allows association rules defining URL-URL relationships, and URL-URL relationships that are strongly influenced by a web site's topology, to be identified and respectively qualified. Superfluous association rules may be separated from non-topology affected association rules and discounted as desired. The invention may be implemented in conjunction with a probalistic generative method used to model a web site and simulate the behavior of a visitor traversing the site. The invention further allows randomized web site visitor behavior to be separated into "interesting" and "uninteresting" behavior.

69 Claims, 8 Drawing Sheets

ASSOCIATION RULE RANKER FOR WEB SITE EMULATION

BACKGROUND OF THE INVENTION

1. Field of the Invention

The present invention relates to applying data mining association rules to sessionized web server log data. More particularly, the invention enhances data mining rule discovery as applied to log data by reducing large numbers of candidate rules to smaller rule sets.

2. Description of the Related Art

Traditionally, discovery of association rules for data mining applications has focused extensively on large databases comprising customer data. For example, association rules have been applied to databases consisting of "basket data"— items purchased by consumers and recorded using a barcode reader—so that the purchasing habits of consumers can be discovered. This type of database analysis allows a retailer to know with some certainty whether a consumer who purchases a first set of items, or "itemset," can be expected to purchase a second itemset at the same time. This information can then be used to create more effective store displays, inventory controls, or marketing advertisements. However, these data mining techniques rely on randomness, that is, that a consumer is not restricted or directed in making a purchasing decision.

When applied to traditional data such as conventional consumer tendencies, the association rules used can be order-ranked by their strength and significance to identify interesting rules (i.e. relationships.) But this type of sorting metrics is less applicable to sessionized web site data because site imposed associations exist within the data. Imposed associations may be constraints uniformly imposed on visitors to the web site. For example, to determine a relationship between site pages that web site visitors (visitors) find "interesting" using traditional data mining association rules, a researcher might look at pages that have strong link associations. However, for typical web site data, this type of association rule would probably be meaningless because of the site's inherent topology as discussed below.

Associations amongst web site pages—web site pages being commonly identified by their respective uniform resource locator (URL)—exhibit behavior biased by at least two major effects: 1) the preferences and intentionality of the visitor; and, 2) traffic flow constraints imposed on the visitor by the topology of the web site. Association rules used to uncover the preferences and intentionalities of visitors can be overwhelmed by the effects of the imposed constraints. The result is that a large number of "superfluous" rules— rules having high strength and significance yet essentially uninformative with respect to true visitor preferences—may be discovered. Commonly, these superfluous rules tend to be the least interesting to the researcher.

For example, association rules can be used to identify unsafe patterns of sessionized visits to a web site. Such rules deliver statements of the form "75% of visits from referrer A belong to segment B." Traffic flow patterns can also be uncovered in the form of statements such as "45% of visits to page A also visit page B." However, such rules that characterize behavior due to intentionality of the visitor will tend to be overwhelmed by rules that are due to the traffic flow patterns imposed upon the visitor by the site topology. Therefore, sorting these rules in the conventional manner will place high importance on rules of the form "100% of visitors that invoked URL A also visited URL B." When a visitor's conduct is dominated by the web site topology, rules emanating from such conduct need to be discounted.

Thresholding out the strongest associations between web site pages is neither practical nor desirable, and manually wading through mined association rules for such associations would be excruciatingly tedious and defeat the basic premise upon which data mining was developed.

What is desperately needed is a way to identify association rules that are strongly influenced by web site topology and therefore considered uninteresting as an association rule. Further, there is a need for the ability to eliminate superfluous association rules from sessionalized web site log data and yet retain the superfluous rules for future use.

SUMMARY OF THE INVENTION

Broadly, the present invention allows association rules that are strongly influenced by a web site's topology to be identified. These superfluous association rules may be separated from non-topology affected association rules and discounted as desired.

In one embodiment, the present invention is implemented in conjunction with a method to model a web site and simulate the behavior of a visitor traversing the site. The methods of the present invention are practiced upon the data generated by the generative model, also referred to as the Web Walk Emulator, and disclosed in U.S. Patent Application entitled "WEB WALKER EMULATOR," by Steven Howard et al., assigned to the assignee of the current invention, incorporated by reference herein and being filed concurrently herewith. The present invention allows randomized behavior within an emulated session to be reduced into "interesting" and "uninteresting" behavior. In another embodiment, the present invention may be practiced upon data accumulated from actual web site visits.

In another embodiment, the invention may be implemented to provide a method to sort association rules by their relative empirical frequency (relevance), or support, within a database comprising URL data. This relevance ranking is dependant upon the URLs constituting a complete set of events, and ranks rules where the relevance of each data set is measured by comparing its associational support against the reference given by an emulated distribution. In another embodiment, rules within a set of rules may be compared. The degree deviation of the relevance, or likelihood. of a rule is compared to a reference, such as the number 1, to determine peaks and lows. These peaks and lows are used to determine whether the behavior of actual users compares favorably with the behavior of emulated users. In another embodiment, these rules may be further sorted to determine point-by-point relevance information to distinguish rules that share a common likelihood ratio yet have different supports.

In another embodiment. associations may be ranked even if the URLs comprise an incomplete system of events that may render an emulated choice non-mutually exclusive. In this case, the events are converted into a probability distribution and sorted. In still another embodiment, the converted events may be sorted using more sensitive associations to seek out rules that have unusual levels of support compared to a baseline reference distribution. In another embodiment, association rules may be ranked by their confidence to estimate these conditional probabilities.

In still another embodiment, the invention may be implemented to provide an apparatus to sort association rules as described in regards to the various methods of the invention. The apparatus may include a client computer interfaced with a server computer used to sort the associations.

In still another embodiment, the invention may be implemented to provide an article of manufacture comprising a data storage device tangibly embodying a program of machine-readable instructions executable by a digital data processing apparatus to perform method steps for sorting association rules as described with regards to the various methods of the invention.

The invention affords its users with a number of distinct advantages. One advantage is that the invention provides a way to avoid the necessity of storing massive amounts of historical URL data used to make future comparisons regarding the actions of a user traversing a web site. Another advantage is that the invention reduces the computational time required to process URL data and associations.

Further, the invention allows the evaluation of "emulated" events that did not actually occur, allowing future behavior of a web site user to be studied using these events.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Figure 1:
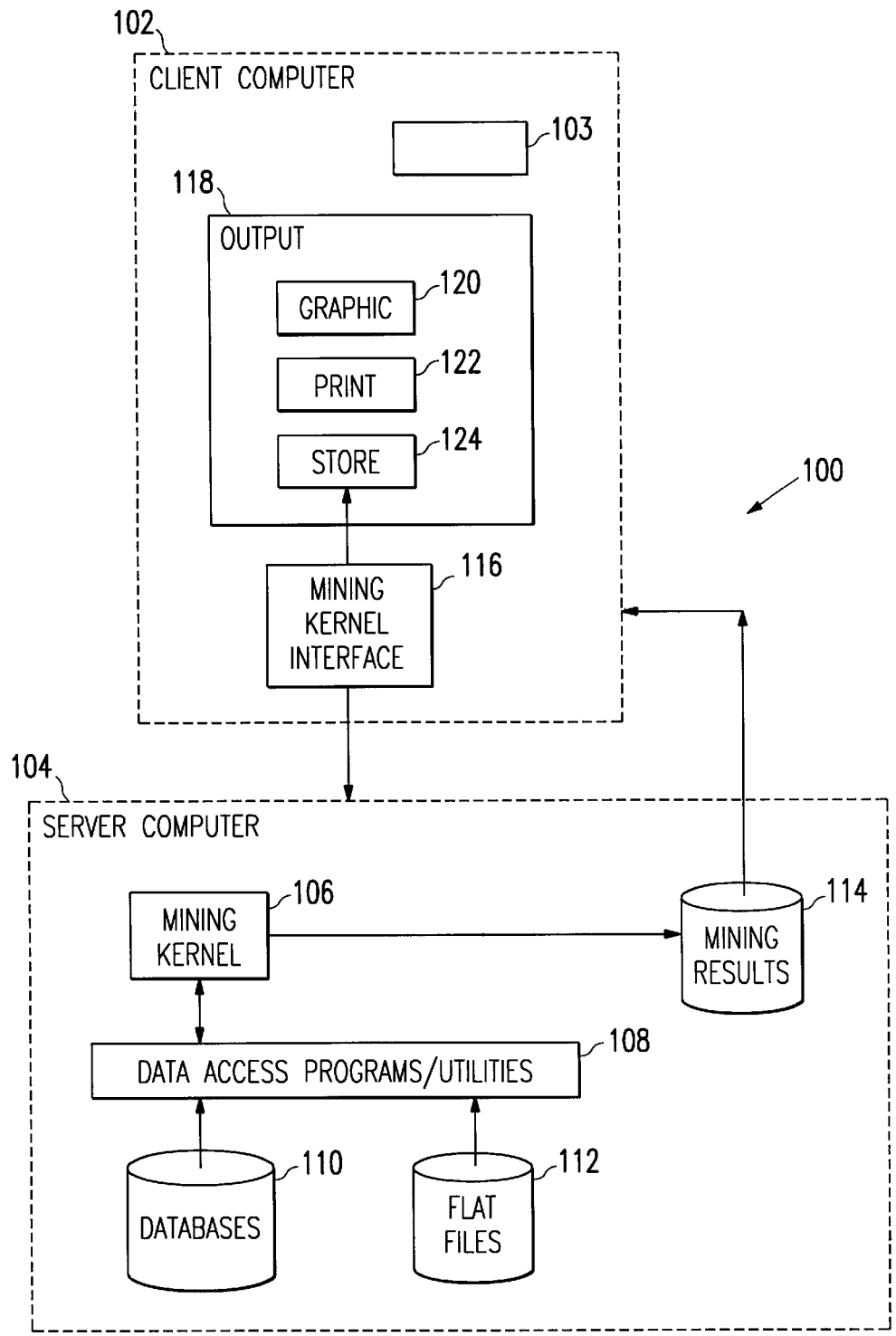
FIG. 1 is a block diagram of the hardware components and interconnections for discovering association rules in accordance with one embodiment of the invention.

The present invention concerns discovering association rules in sessionized web server log data in the presence of constraints that may be expressed as Boolean expressions over the presence or absence of items in the database. Such constraints allow users to specify a subset of rules in which the users are interested. The constraints are integrated into an association rule discovery method instead of being performed in a post-processing step, thereby substantially reducing the time required to discover association rules.

The present invention includes various preferred methods for generating "candidate" itemsets and may be implemented in a broader sense as discussed in U.S. Pat. No. 5,615,341, Agrawal et al., for "SYSTEM AND METHOD FOR MINING GENERALIZED ASSOCIATION RULES IN DATABASES." assigned to the assignee of the current invention and incorporated herein by reference above.

Furthermore, the present invention may be used in conjunction with other methods using candidate generation, such as disclosed in Toivonen, "Sampling Large Databases for Association Rules," Proc. of the 22nd Int'l. Conf. on Very Large Databases (VLDB), Mumbai (Bombay), India, September 1996, and may be applied directly to the methods disclosed in Srikant et al., "Mining Generalized Association Rules," Proc. of the 21st Int'l. Conf. on Very Large Databases (VLDB). Zurich, Switzerland, September 1995. Each of the above references are also incorporated by reference herein.

To better understand the methods of the invention, a general statement of the relationships, nomenclature, and environment used to implement the various embodiments of the invention follows in sections A–E. Thereafter, the apparatuses. methods and signal bearing mediums of the present invention are described.

A. Introduction

A "session" is an ordered set of URLs associated with a particular visitor to a web site. A session tracks the "click-stream lifespan" of a visitor to a web site. "Sessionizing" web server log data involves splitting the data into mutually disjoint sessions. The click-stream lifespan of a session therefore consists of the sequence of URLs visited along the way during the session.

Sessionized visits allow the invention to discover where visits come from, and where a user traversing the site tends to exit the site. For instance, given a set of "referrers" (sites from which a visit originates), and a set of candidate "exit pages" (URLs which may serve as the final URL visited during a session) the invention may evaluate the probability that a session originated from a particular referrer, as well as the probability that a session ends via a particular exit page. Possible associations between the two may be discovered by examining the probability that a session will end via a particular exit page, given that the session originated from a particular URL. In another example, the intuition may discover whether visitors to page A also tend to visit page B, where page A and B can be chosen from choices that are not mutually exclusive over the life of a session, and whereas each session has only a single referrer, entry page, and exit page.

B. Definitions

Let $U=\{u_1, u_2, \ldots, u_R\}$ be a table of URLs, and let $u \in U$. A session $s=(s_1, s_2, \ldots, s_L)$, $s_i \in U$, $i=1, 2, \ldots, L$, for some finite integer $L=L(s)=\#s$. Therefore, a session is a sequence of URLs.

Further, $\Omega = \cup L/l=1 \times L/i=1 U$ where $L=\infty$. For a finite session, L is finite. Observed sessions are a realization on the probability space $(\Omega, 2^\Omega, \mu)$ where $2^\Omega$ is the sigma algebra in $\Omega$ given by the set of all subsets of $\Omega$. An element $\omega$ of $\Omega$—where $\omega$ is a "sample point"—gives a realization of a session, and an element $2^\Omega$ (an "event") is a set of sessions. $\Omega$ can be thought of as an index table containing pointers into the set of all "permissible" sessions, where for convenience all sessions of up to length L are considered. If S is a random session from this set, and given a particular $\omega$ in $\Omega$, $s=S(\Omega)$ and denotes a realization of S. Therefore, if A={all sessions containing u} then the probability that a random session contains (i.e., "visits") u at least once is given by $\mu(A)$.

The probability that a random session S contains u may be denoted by $P(u \in S)$, or in a simple embodiment simply $P(u)$. Likewise, the probability that a session visits, for example, both $u_1$ and $u_2$ may be denoted by $P(u_1, u_2)$.

C. Association Rules and Web Sites

Association rules find regularities between sets of items, for example, when an association rule $A \rightarrow B$ indicates that transactions of a database which contain A also contain B. Either the left hand side ("antecedent" or "head") or the right hand side ("consequent" or "body") can comprise multiple events. Rules of the form $u_1\ u_2 \rightarrow u_3\ u_4\ u_5$ may be encountered. A rule A→B is defined as having a confidence c% over a set of sessions if c% of the sessions that contain A also contain B, and support s if s% of all sessions contain both A and B.

Efficient algorithms for finding association rules have been provided for mining large databases such as discussed in Agrawal et al., "Fast Discovery of Association Rules," *Advances in Knowledge Discovery and Data Mining,* Fayyad, U. M. et al. eds., AAAI Press/The MIT Press, Menlo Park, Calif., 1996. However, when applied to web server data, the problem arises that an abundant set of rules must be "distilled" to a manageable size. One way is to rank order rules according to measures of "relevance," "strength," or "importance." One measure of relevance is the support s. A useful measure of strength is given by the confidence c. Other candidate measures are the product of the two, such as cs, as well as c log c and s log s. In conventional transactional databases, these measures can be meaningful, as s measures the portion of transactions in which a rule is relevant, and c gives a direct measure of the associational strength.

However, when used to rank order rules over URLs gleaned from sessionized web server log data, ranking by confidence and support can yield poor results. This is the case when association rules are used to analyze traffic flow patterns of visits to a site, and then those traffic flow patterns are used to infer regularities about the preferences and intentionality of the visitors. Association rules based on confidence and support detect regularities in traffic flow regardless of whether they are due to intentionality on the part of the visitor, or due to forced paths imposed upon the visitor by the web site structure. A rule with substantial support s and strong confidence c can be uninteresting. This follows from what we know about the web site construction, because essentially all visits are subject to certain traffic flow constraints, that may provide little option for choice.

A particular example is given by an entry form. To view the entry form, one must visit URL "E." This is a matter of choice as not all visitors must view the form. To submit the form, one must visit URL F. This is also a matter of choice, because not all visitors that view the form must submit it. However, it is unsurprising that the rule F→E will have confidence of 100% if all visitors that submit the form must also view the form because this association is not a matter of choice: the two-necessarily occur together if F occurs at all.

Another scenario may arise where page A on a given web site has links to pages B, C, and D, and where these three pages are not accessible from links off any other page other than A on this site. Then rules B→A, C→A, and D→A may have confidences of 100% for the same reason: namely, traffic flow constraints impose this regularity. On the other hand, consider the rules A→B, A→C, and A→D. Furthermore, assume that page A has no other links. If these rules have confidences of 33%, 33%, and 34% respectively, it indicates a very balanced distribution of traffic across these three links. This fact might be interesting to the administrator of the site, or even to the web architect whose job it is to arrange the content on the site to suit the visitors' preferences. On the other hand, it may be less interesting to those most interested in traffic flowing to page D. Although it receives slightly more traffic than the other two paces, the traffic flow it receives is not much more than that which can be explained by random choice, for example, for visitors making completely random choices at each decision point.

Alternatively, it might be of substantial interest if these confidences were instead 5%, 5%, and 90%. It might be even more interesting where E→D, where E is a page that does not have direct links to either A or D, yet rule E→D has confidence of 10%. Although 10% may seem like a low number relative to the examples just considered, this level of confidence may actually be striking if it is due to apparent strong mutual interest in both E and D even though the two pages are not directly accessible from each other.

Currently, eliminating these types of problems by direct analysis of a web site's topology is either impractical or entirely unachievable. For example, graph connectivity analysis alone does not suffice, because solving this problem requires knowledge of the routing between traversal links. In actual web server logs, the situation is complicated by the fact that pages tend to be accessible in multiple ways, and that links can appear on multiple pages. Furthermore, pages can be created dynamically depending upon the attributes of the visitor. Because page content can determine the link traversal topology, web site topology itself can therefore be dynamic.

D. The "Web Walker Emulator"

The Web Walker Emulator incorporated by reference above may be used to implement the methods of the present invention. In one embodiment, the Web Walker Emulator is a method for creating a probabilistic generative model of a web site that simulates the behavior of visitors traversing through the site. This simulation "emulates" the behavior of actual visitors to a web site. The parameterization of the simulation can be adjusted in one embodiment such that these "emulated" visitors display behavior that is substantially indistinguishable from those of actual users (or a subset thereof) with respect to population statistics observed over their respective traffic patterns. Or, in another embodiment, it can be tuned to display hypothetical behavior such as visitors acting without evidence of intentional choice. Tracking the site usage traffic of emulated visitors may yield a set of reference distributions ("emulated distributions") against which may be compared the site usage distributions obtained for actual users. The emulated distributions are used to implement estimation methods which measure relative information content. The Kullback-Liebler Information Criterion and the Bayesian criteria, widely known to those schooled in the art, are two such estimation methods. The result is a set of reference distributions against which the distributions obtained for actual users may be compared.

E. Applying Emulated Distributions

A set of session logs derived from actual visits to a site generally provide the basis for a set of distributions that describe the behavior of those visits. In particular, these distributions describe behavior that is visible from the web server. If a distribution based upon behavior that is unobservable to the web server is obtained, such a distribution may embody behaviors that are known to exist but are unobservable or, purely hypothetical. However, the availability of such a distribution allows differences between arbitrary distributions to be discovered. This is useful in cases where conventional statistics are unsatisfactory. For instance, conventional statistical analysis of "significance," or of associational "strength" and "relevance" implicitly assume that the reference distribution is a uniform distribution, that is, where sample points are equally likely under the same hypothesis. In certain applications such statistics are at best unsatisfactory or at worst misleading, because the preferable null hypothesis is one where the sample points are drawn from a distribution with different yet known qualities. In one embodiment, the present invention allows randomized behavior within an emulated session to result in highly structured behavior that is "significant" in the usual statistical sense.

In the present invention, a reference distribution allows powerful and general-purpose information theoretic statistics to be applied as discussed below for extracting information from a distribution of interest. The Kullback-Liebler Information Criterion (KLIC) mentioned above is one such method that can be used by the present invention for discriminating between distributions. In particular, it measures the directional divergence between two distributions, meaning that the measure is not symmetric. Although it is not a distance measure, it is sometimes referred to as the "KL-distance." It is also easy to construct a variation of the KLIC that yields a non-directional pseudo-distance measure (cf.[Ullah, A., "Entropy, Divergence and Distance Measures with Econometric Applications," Working Paper in Economics, Department of Economics, University of California, Riverside, Riverside, Calif., *Journal of Statistical Planning and Inference,* 49:137–162, 1996]). For background on the KLIC see White, H., "Parametric Statistical Estimation with Artificial Neural Networks: A Condensed Discussion," *From Statistics to Neural Networks: Theory and Pattern Recognition Application,* V. Cherkassky, J. H. Friedman and H. Wechsler eds., 1994 and White, H., "Parametric Statistical Estimation with Artificial Neural Networks," P. Smolensky, M. C. Mozer and D. E. Rumelhart eds., *Mathematical Perspectives on Neural Networks,* L. Erlbaum Associates (to appear), Hilldale, N.J., 1995. For an elegant and concise overview of distributional information measures in general, see Ullah, A., 1996, supra. A brief introduction of KLIC is provided below.

1. Relative Entropy

Let P and R be two candidate session generating processes (i.e., probability measures) over the set of permissible sessions, an index into which we have denoted $\Omega$. More precisely, P and R are probability measures on $(\Omega, 2^\Omega)$. We wish to determine which of P and R is responsible for generating a given (realization of a) session $s=S(\omega)$ where $\omega \in \Omega$.

Let Q be a probability measure that dominates both P and R. This means that for each permissible set of sessions A, $Q(A)=0$ implies $P(A)=0$ and $R(A)=0$. In some practical circumstances Q may equal R. Let $\rho_P=dP/dQ$, and $\rho_R=dR/dQ$, representing associated (Radon-Nikodym) type density functions. Applying Kullback and Liebler, the log density ratio is $\log[\rho_P(\omega)/\rho_Q(\omega)]$ as the information in $\omega$ for discriminating between P and R. This quantity is known as the log likelihood radio and may be optimal in a variety of senses for discriminating between P and R.

The expected value of the log likelihood ratio yields the KLIC:

$$I(\rho_P:\rho_R)=\int \Omega \, \log(\rho_P(s)/\rho_R(s))\rho_P(s)Q(ds).$$

If Web sessions are generated by P, then the KLIC quantifies the information theoretic measure of "surprise" experienced on average when sessions are described by P and are described by R. When the intersection of the supports of R and Q is nonempty and the integral is taken over a finite space, this simplifies to:

$$I(\rho_P:\rho_R)=\Sigma/s\epsilon supp(R) \, (\rho_P(s)\log(\rho_P(s)/\rho_R(s))).$$

and is commonly referred to as "cross-entropy" or "relative entropy." Accordingly, let $K(P:R)=I(\rho_P:\rho_R)$.

Reference may also be made to the following two quantities:

$$\rho_P(s)/\rho_R(s),$$

and $$\rho_P(s)\log(\rho_P(s)/\rho_R(s)).$$

The former is the likelihood ratio. The latter is the information in s for discriminating between P and R.

2. Information and Entropy

Several forms of information and entropy exist. Information and entropy are closely related, as entropy is "minus" the information [Ullah, A., 1996, "Entropy, Divergence and Distance Measures with Econometric Applications," Working paper in Economics, Department of Economics, University of California, Riverside, USA 92521, *J. of Statistical Planning and Inference,* 49:137–162.]. KLIC generalizes the notion of entropy. Shannon-Wiener entropy is a special case of the KLIC that arises when R dominates P [White, H., 1994, supra]. Entropy measures the "uncertainty" of a single distribution (cf. [Khinchin, A., *Mathematical Foundations of Information Theory,* Dover Publications, Inc., NY, 1957], [Ullah, A., 1996, supra]).

To illustrate the difference between Shannon-Wiener entropy and the KLIC, consider for example a finite probability scheme. When applied to a "complete system" of n events (a mutually exclusive set of which one and only one must occur at each trial) uncertainty is maximized when all events are equally likely (giving each a pointwise probability or "density" of $n^{-1}$). Furthermore, given that all events are equally likely, uncertainty increases with the number of events n. For a finite system, uncertainty is minimized when all likelihood concentrates on a single point, in which case the entropy is zero.

By comparison, the KLIC is a relative measure of information available for distinguishing a target distribution from a reference distribution. It's absolute value is minimized when the target is indistinguishable from the reference—in this case knowing the reference implies knowing the target. For a finite system in which each event is equally likely under the reference distribution, the KLIC is equal to minus the Shannon-Wiener entropy (discussed above) of the target distribution plus a constant. In the preferred embodiment, the present invention requires KLIC (relative entropy) because traditional entropy measure methods rank superfluous association rules highly, exactly the problem that the present invention addresses. One reason superfluous association rules may be highly ranked is because even "randomized" visitor behavior can be highly structured—therefore, have low entropy—due to traffic flow constraints imposed by the web sit topology.

For additional background on the KLIC, White, H., 1994, supra and White, H., 1995, supra, may be consulted and for a concise yet comprehensive survey of KLIC compared and contrasted with other information measures (including Shannon-Wiener information and mutual information) see Ullah, A., 1996, supra.

The above discussion relating to definitions used to explain the methods of the invention and the environment in which the methods may be practiced should be particularly helpful in understanding how the methods are implemented, and the hardware associated therewith.

Hardware Components & Interconnections

One aspect of the invention concerns an apparatus for extracting desired data relationships from a web site database, which may be embodied by various hardware components and interconnections as described in FIG. 1.

Referring to FIG. 1, a data processing apparatus 100 for analyzing databases for generalized association rules is illustrated. In the architecture shown, the apparatus 100 includes one or more digital processing devices, such as a client computer 102 having a processor 103 and a server computer 104. In one embodiment, the server computer 104 may be a mainframe computer manufactured by the International Business Machines Corporation of Armonk, N.Y., and may use an operating system sold under trademarks such as MVS. Or, the server computer 104 may be a Unix computer, or OS/2 server, or Windows NT server, or IBM RS/6000 530 workstation with 128 MB of main memory running AIX 3.2.5. The server computer 104 may incorporate a database system, such as DB2 or ORACLE, or it may access data on files stored on a data storage medium such as disk, e.g., a 2 GB SCSI 3.5" drive, or tape. Other computers, servers, computer architectures, or database systems than those discussed may be employed. For example, the functions of the client computer 102 may be incorporated into the server computer 104, and vice versa.

FIG. 1 shows that, through appropriate data access programs and utilities 108, a mining kernel 106 accesses one or more databases 110 and/or flat files (i.e., text files) 112 which contain data chronicling transactions. After executing the steps described below, the mining kernel 106 outputs association rules it discovers to a mining results repository 114, which can be accessed by the client computer 102.

Additionally, FIG. 1 shows that the client computer 102 can include a mining kernel interface 116 which, like the mining kernel 106, may be implemented in suitable computer code. Among other things, the interface 116 functions as an input mechanism for establishing certain variables, including the minimum support value or minimum confidence value. Further, the client computer 102 preferably includes an output module 118 for outputting/displaying the mining results on a graphic display 120, print mechanism 122, or data storage medium 124.

Operation

In addition to the various hardware embodiments described above, a different aspect of the invention concerns a method for applying association rules to sessionalized web server log data. Throughout the following description, a given set of sessions from which web server log data is gathered may be treated as a realization of a random variable drawn from a stationary data generating process.

One use of an emulated distribution is to simulate the behavior of actual visitors. The procedure may comprise in one embodiment parameterizing the Web Walk Emulator to closely match the behaviors of actual visitors and fine-tuning these parameters to minimize the relative entropy divergence between the emulated and actual distributions by, for example, way of gradient local optimization or by global optimization over a computational grid laid down over parameter space, or by a combination of global and local search. The resulting optimized parameterization can be used to generate the population statistics exhibited by the original visitors.

Consider the task of comparing user behavior from historical data with current day behavior. As a simple means of accomplishing this comparison, historical data can be saved and used for future comparisons. However, this approach has several drawbacks:

1. The amount of data can be massive, requiring excessive storage space,

2. Even if storage space is not an expensive resource, processing such a large amount of data may be more expensive than is necessary, especially if the data is highly redundant. One solution is to compress the data into a set of sufficient statistics and then save only that compressed data set.

3. While compressing a store of data into a set of sufficient statistics can be desirable, anticipating what statistics to calculate for future reference can be difficult, especially where subjective preferences change over time: what is considered important today may not be interesting tomorrow. Conversely, information considered discardable today may become useful tomorrow.

Having "emulated users" with the same behavioral characteristics as historical users allows us to evaluate an arbitrary set of statistics at a later time, including statistics that were invented after the historical data was observed. It is possible to create hypothetical situations that were not presented to the historical users, and computationally "imagine" what behaviors historical users night have exhibited if subjected to the hypothetical set of choices. In the present invention. "emulation" combined with "simulation" allows hypothetical situations to be considered, such as, "how would last year's users react to this year's web site structure?" This behavior can then be used as a reference distribution for comparison against this year's behavior. The following discussion discloses the methods of the present invention that may be used by the Web Walk Emulator for detecting meaningful URL-URL associations.

Overall Sequence of Operation

FIGS. 2–7 show several methods to illustrate examples of the various method embodiments of the present invention. For ease of explanation, but without any limitation intended thereby, the examples of FIGS. 2–7 are described in the context of the apparatus 100 described above.

1. Ranking Association Rules by Support a. Sets of Rules over a Complete System of Events In the present invention, a complete system of events may be a mutually exclusive set of which one and only one must occur at each trial. Association rules can be applied to measure the strength of association between an event A and a set of options that comprise a complete system, say one having n events such as $B=(B_1, B_2, \ldots, B_n)$. This generates n association rules: $A \rightarrow B_1, A \rightarrow B_2 \ldots A \rightarrow B_n$. One distribution of interest is given by examining the "support" of each rule. Let P give the target probability distribution for actual visits contained in a database of step 204 shown in FIG. 2. The "support" of rule $A \rightarrow B_1$ over the set of sessions observed from actual visits (actual support) measures a specific quantity—defined above with respect to Association Rules—that is directly observable in empirical samples. Although strictly speaking "support" measures an empirical relative frequency, given a sufficient amount of data and a sufficiently "stationary" data generating process, it may be used to estimate the generally unobservable $P(A,B_1)$. Therefore, the support s may be used as an estimate of the probability $P(A,B_1)$ that defines the data generating process underlying the original data set. For clarity, probabilistic quantities (such as $P(A, B_1)$) rather than their estimates s will be discussed. However, the following holds true if s is used instead.

A rule such $A \rightarrow B_1$ can be evaluated over different realizations of the same type of data, such as that produced by different realizations (e.g., as provided by a generative model such as the Web Walk Emulator, or, as observed from the same web site over a different time span) and stored in the database of step 204. If $R(A,B_1)$ gives the support of this rule as measured over emulated visits (henceforth we refer to it as "emulated support") in step 206, two probability distributions over n events are considered that can be compared via relative entropy, namely, $P_{AB}=P(A,B_1),P(A,B_2),\ldots P(A,B_n)$ and $R_{AB}=R(A,B_1),R(A,B_2),\ldots,R(A,B_n)$. Further, $K(P_{AB}:R_{AB})=0$, where it is some constant value, if and only if these distributions are identical. One way to apply this is to compare $P_{AB}$ with a different set of association rules, say $P_{AC}=P(A,C_1),P(A,C_n),\ldots,P(A,C_m)$, for some integer m and complete system of events $C=(C_1, C_2, \ldots, C_n,)$, by computing $K(P_{AC}:R_{AC})$ and comparing with $K(P_{AB}:R_{AB})$ in step 208. If $K(P_{AC}:R_{AC})>K(P_{AB}:R_{AB})$, then association rules applied to the system of events C have higher relevance on average (as compared against the backdrop of the reference $R_{AC}$) than that observed for rules over B (as compared against the backdrop of the reference $R_{AB}$). The method ends in step 210.

b. Individual Rules over a Complete System of Events

Figure 2:
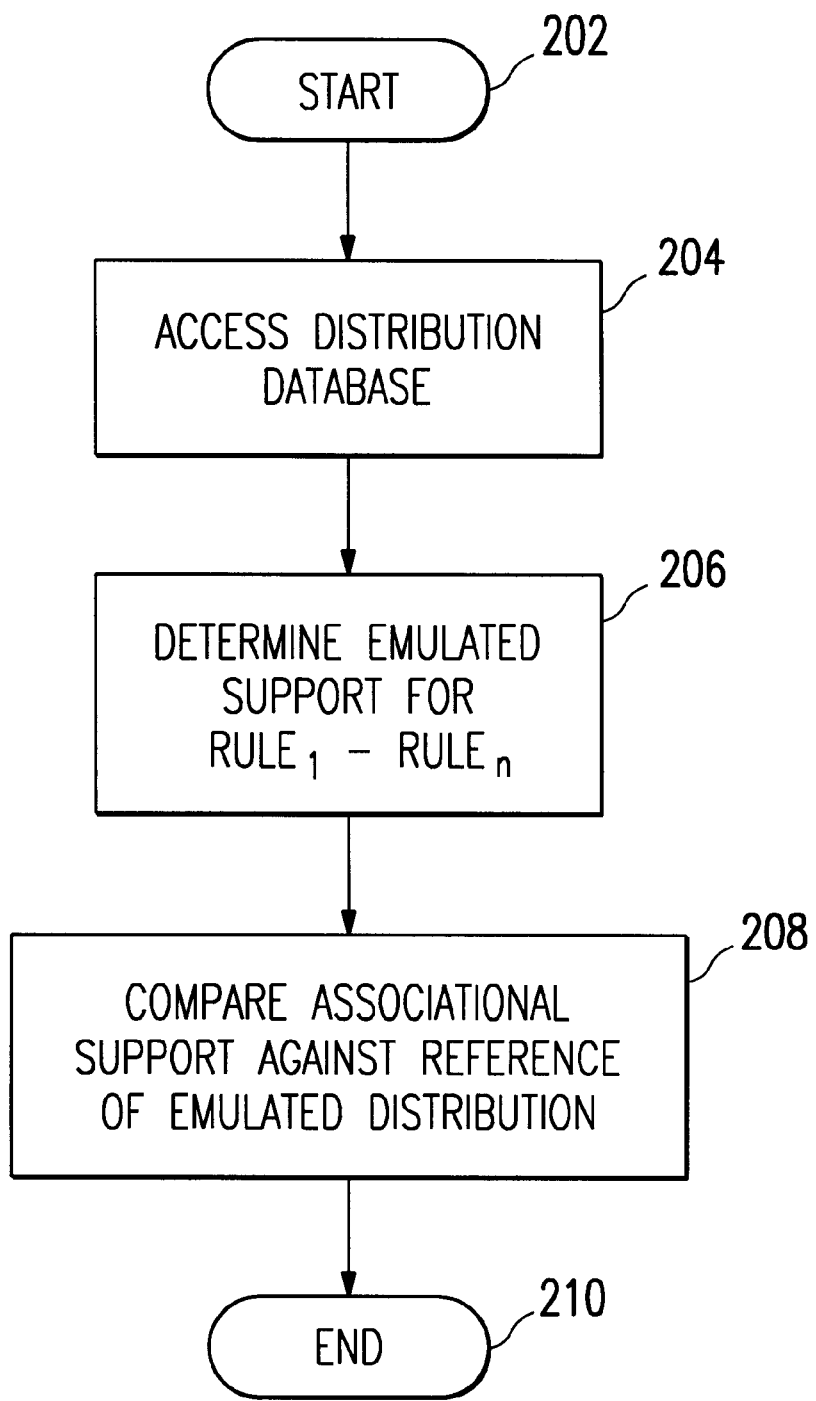
FIG. 2 is a flowchart of an operational sequence to sort association rules in accordance with one embodiment of the invention.
Figure 3:
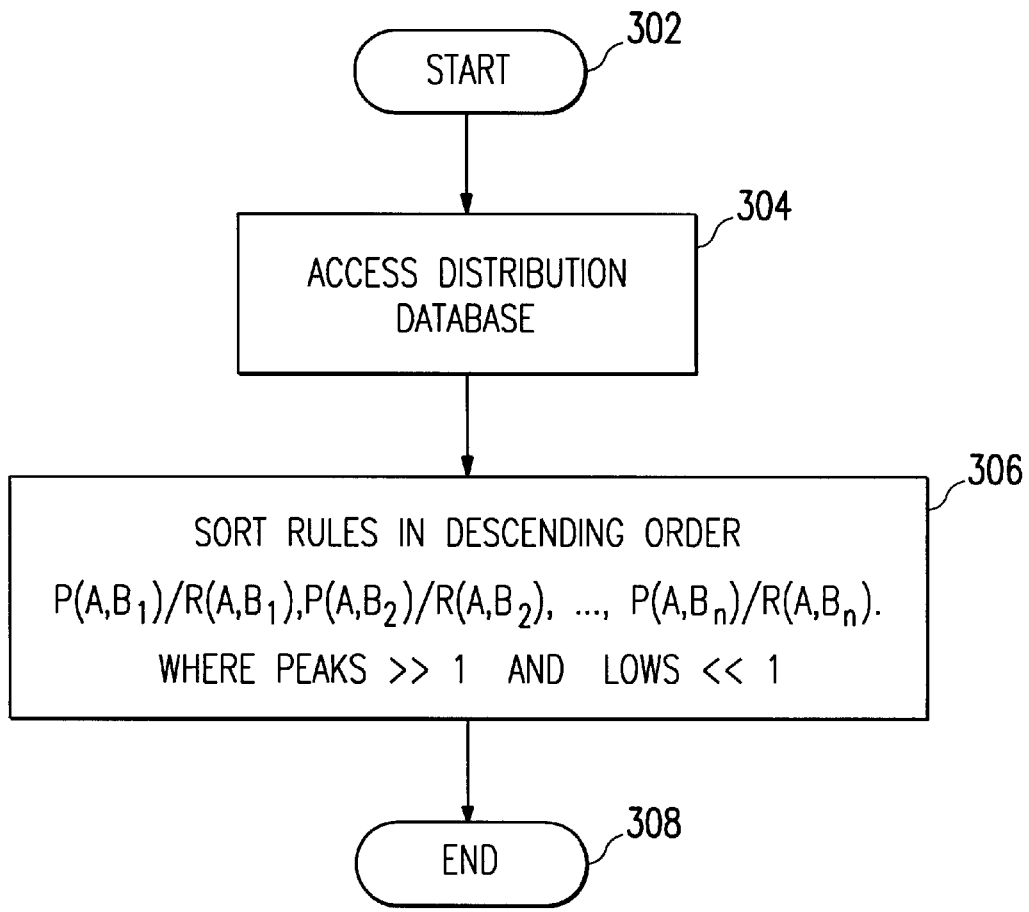
FIG. 3 is a flowchart of an operational sequence to sort association rules in accordance with one embodiment of the invention.

The ranking method discussed above with respect to FIG. 2 compares the relevance of two sets of rules in which the consequents of the rules comprise a complete set of events, where the relevance of each set is measured by comparing its associational support against the reference given by an emulated distribution. However, rules within the same set may also be compared as shown in FIG. 3. Relative entropy is a measure of "expected" information content for discriminating between two distributions—i.e., it is an average value of a pointwise measure. This pointwise measure can be used to compare individual rules within a set of rules. More, precisely: it can be used to compare measures over a set of rules, given that these measures comprise a probability distribution.

For example, if the rules $A \rightarrow B_1, A \rightarrow B_2, \ldots, A \rightarrow B_n$ contained in the database of step 304 are to be ranked according to their "surprise" in the sense that the rule support measured over the actual users is large relative to the rule support measured over emulated visits, one way—based upon the relationship of $\rho_P(s)/\rho_R(s)$ discussed above with regards to relative entropy—is to sort the quantities in descending order in step 306:

$$P(A,B_1)/R(A,B_1), P(A,B_2)/R(A,B_2), \ldots, P(A,B_n)/R(A,B_n).$$

Sorting these likelihood ratios is equivalent to traversing $P_{AB}/R_{AB}$ and looking for places where it deviates significantly from 1, here $P_{AB}=P(A,B_1),P(A,B2),\ldots,P(A,B_n)$ and $R_{AB}=R(A,B_1),R(A,B_2),\ldots,R(A,B_n)$. Peaks (ratios much greater than 1) show where the support of rules as described by $P_{AB}$ is significantly greater than that described by $R_{AB}$. Dips (ratios much less than 1) show where the support under $P_{AB}$ is unusually lower than what is suggested by $R_{AB}$. Ratios close to 1 show where the behavior of actual users is consistent with that emulated users. The method ends in step 308.

C. Individual Rules over a Complete System of Events, Weighted by Support

Sorting rules by their support likelihood as discussed above with respect to FIG. 3 results in rules with very high or very low likelihood ratios being distinguished, even if those rules have negligible support. An appropriate solution is to sort in step 406 of FIG. 4 the quantities based upon the relationship of $\rho_P(s)\log(\rho_{P(s)}/\rho_R(s))$, after accessing a database in step 404 discussed above with regard to relative entropy:

$$P(A,B_1)\log(P(A,B_1)/R(A,B_1)), P(A,B_2)\log(P(A,B_2)/R(A,B_2)), \ldots, P(A,B_n)\log(P(A,B_n)/R(A,B_n)).$$

The "pointwise" information derived in this sorting method, given two rules for which the likelihood ratios are equal, breaks the "tie" by considering the actual support. Therefore, if using the ratio to detect unusually high support (sorting in descending order in step 408 and picking rules that rise to the top in step 410), then the rule with the higher actual support will prevail in step 412. If using the ratio to detect unusually low support (sorting in ascending order in step 414 and picking rules that rise to the top in step 416), then the rule with the lower actual support will prevail in step 418. The method ends in step 420.

d. Ranking Rule Support over Non-Mutually Exclusive Choices

Figure 4:
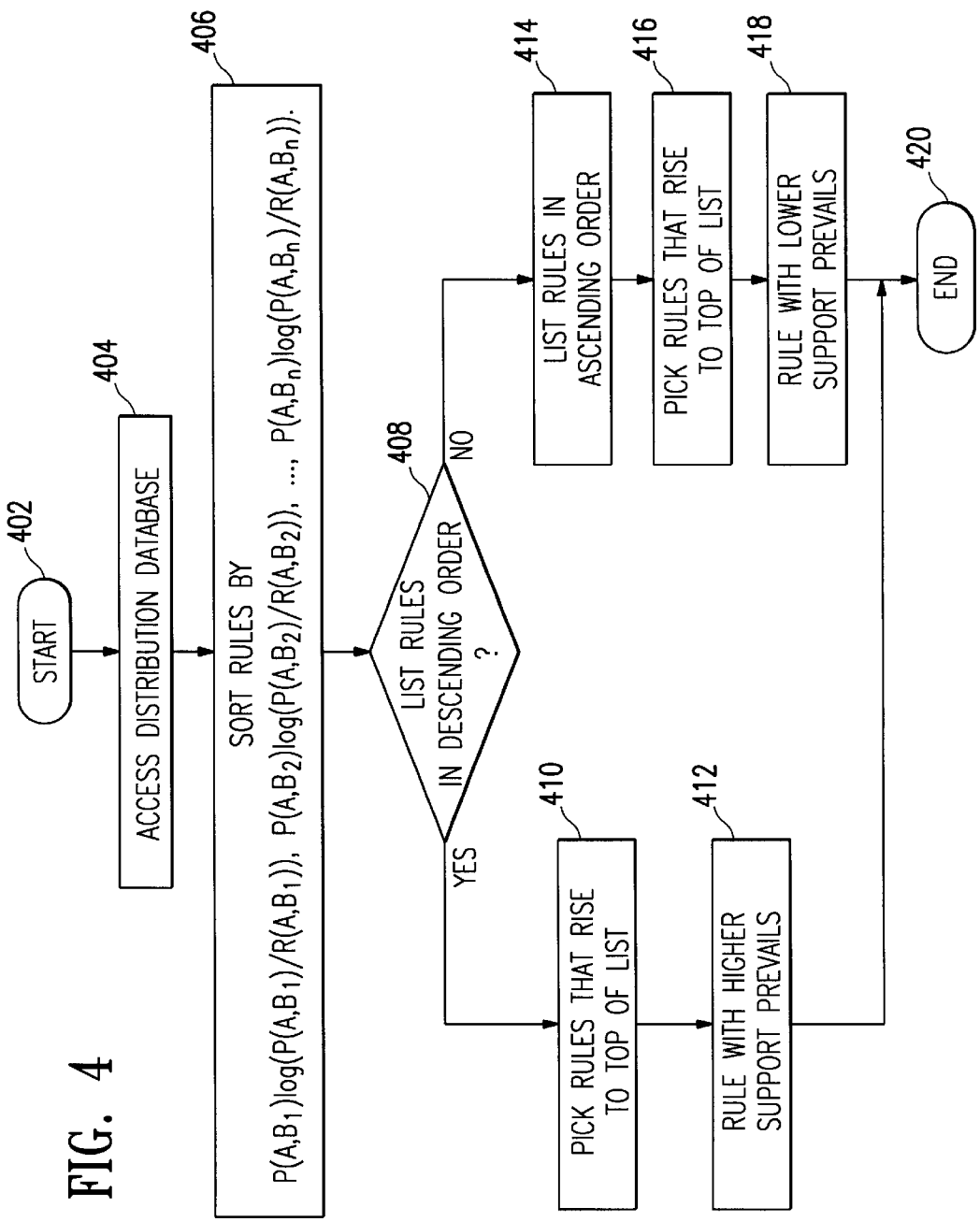
FIG. 4 is a flowchart of an operational sequence to sort association rules in accordance with one embodiment of the invention.
Figure 5:
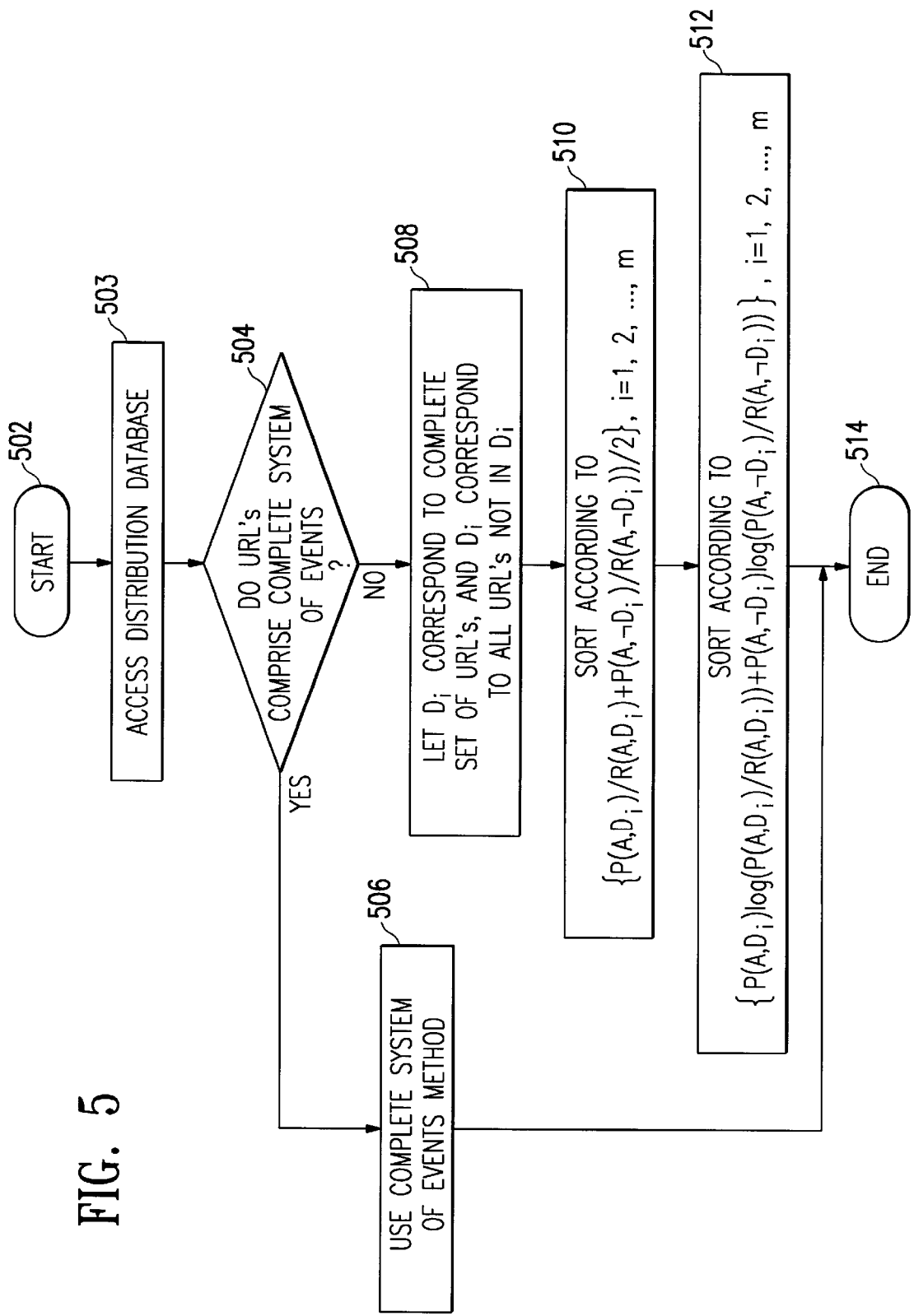
FIG. 5 is a flowchart of an operational sequence to sort association rules in accordance with one embodiment of the invention.
Figure 6:
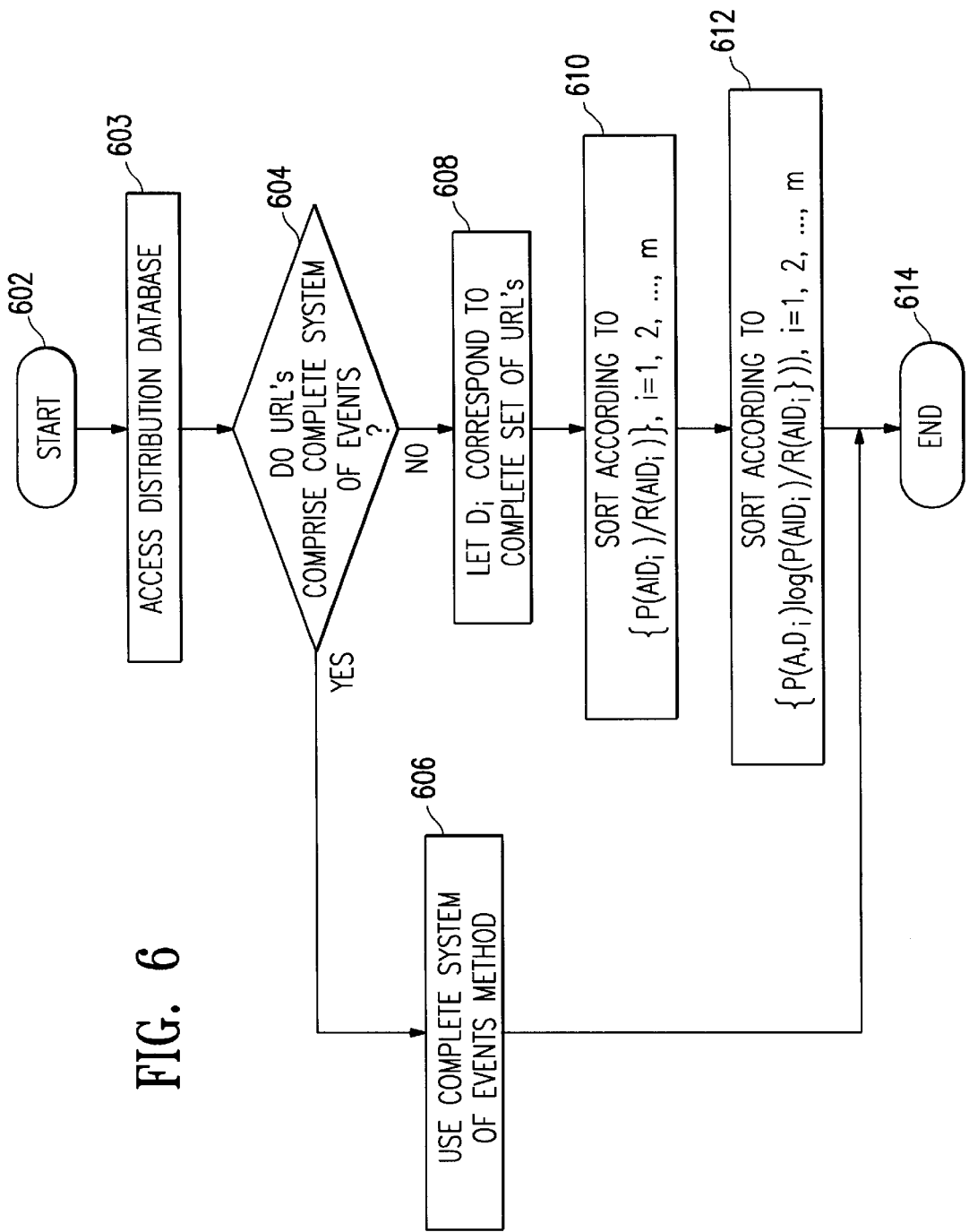
FIG. 6 is a flowchart of an operational sequence to sort association rules in accordance with one embodiment of the invention.
Figure 7:
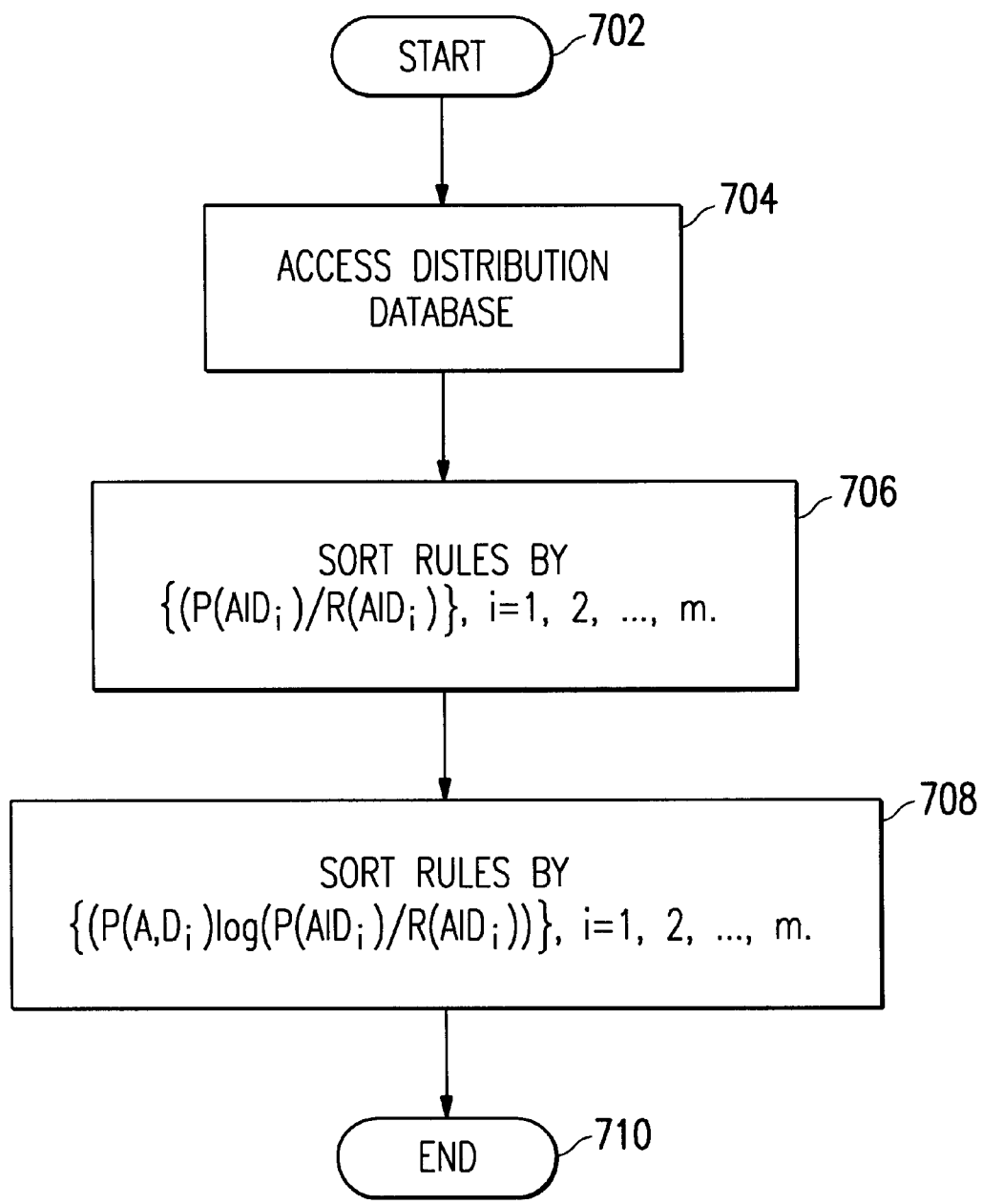
FIG. 7 is a flowchart of an operational sequence for sorting association rules in accordance with the invention.

If associations are applied to URLs in the database step 502 of FIG. 5 that do not comprise a complete system of events in step 504, a users choice or event may not be mutually exclusive. If the complete system of events has occurred, a different method for sorting is applied in step 506, for example, a method as shown in FIGS. 2–4. However, "incomplete" events may be converted into a probability distribution by letting event $D_1$ correspond to a set of URLs, where a head and a body of an association can refer to a single URL or to a set of URLs in step 508, and event $\neg D_1$ corresponds to "not $D_1$"—i.e., all other URLs besides those in $D_1$. Therefore, $\{D_1, D_2, \ldots, D_m\}$ can be an arbitrary set of objects that are not mutually exclusive and can be examined in step 510 by sorting "m" quantities as follows:

$$\{P(A,D_i)/R(A,D_i)+P(A,\neg D_i)/R(A,\neg D_i)/2\}, i=1,2,\ldots,m. \quad \text{A.}$$

This indicates for each i where the observed support for the two rules $\{A \rightarrow D_i, A \rightarrow \neg D_i\}$ is much different than that exhibited in the reference distribution, for example, as provided by a generative model such as the Web Walk Emulator. In order to give preference to rules having higher support, relative entropy is applied in step 512, sorting the following m quantities:

$$\{P(A,D_i)\log(P(A,D_i)/R(A,D_i))+P(A,\neg D_i)\log(P(A,\neg D_i)/R(A,\neg D_i))\}, i=1,2,\ldots,m. \quad \text{B.}$$

This compares the pairs of rules $\{(A \rightarrow D_1, A \rightarrow \neg D_1),(A \rightarrow D_2, A \rightarrow \neg D_2) \ldots \{(A \rightarrow D_m, A \rightarrow \neg D_m),\}$ with each other on the basis of whether their support over one data set is unusually high (respectively, low) as compared with the support as evaluated over a data set representing a baseline reference distribution. The method ends in step 514.

Both of the sorting method notations expressed in this section and FIG. 5A are applications of general methods of converting each rule into a corresponding distribution, and then using a distributional measure (average likelihood ratio in (A), and relative entropy in (B)) to compare the resulting distribution with a baseline reference. However, the following quantities may be sorted instead as shown in steps 610 and 612 of FIG. 6:

$$\{P(A,D_i)/R(A,D_i)\}, i=1,2,\ldots,m. \quad \text{C.}$$

$$\{P(A,D_i)\log(P(A,D_i)/R(A,D_i))\}, i=1,2,\ldots,m. \quad \text{D.}$$

Statement (C) may be interpreted as seeking out rules that have unusual levels of support compared to a baseline reference distribution, regardless of whether or not the rules are highly supported in the available data as determined by P. Statement (D) also seeks out rules having unusually high or low support, but weights them according to their support over the observed data as determined by P such that given two rules with identical likelihood ratios, the one with greater support will be sorted closer to the head (or tail) of the rank ordering. The method ends in step 614.

2. Ranking Rules by Their Confidence

In another embodiment. and under the appropriate conditions (e.g., sufficient data, stationary data generating process), association rules' measures of "confidence" can be used in one method to estimate conditional probabilities. In particular, the confidence of rule A→B gives a useable estimate of the conditional probability P(A|B). The same techniques as described immediately above may be applied for rule support to compare the confidence of rules against a baseline reference distribution. Relationships such as defined in statements (C) and (D) above are easily applied to evaluating rule confidence. With substitution of the appropriate conditional probabilities, the relationships and the rules are sorted in steps 706 and 708 where:

$$\{(P(A|D_i)/R(A|D_i)\}, i=1,2,\ldots,m. \qquad \text{E.}$$

$$\{(P(A,D_i)\log(P(A|D_i)/R(A|D_i))\}, i=1,2,\ldots,m. \qquad \text{F.}$$

Sorting likelihood ratios as described above are equivalent to traversing the distribution $P_{AB}/R_{AB}$ and looking for places where it deviates significantly from 1. Peaks (ratios much greater than 1) show where the confidence of rules under $P_{AB}$ is significantly greater than what is suggested by $R_{AB}$, and dips (ratios close to 0) show where the confidence under $P_{AB}$ is unusually lower than what is suggested by $R_{AB}$. Comparatively speaking, the interpretation of the relationship statement (E) is not as tidy because the conditional probabilities do not in general lend themselves to forming a probability distribution; for each i in statement (E) simply delivers a pointwise measure of the information content for discriminating between the two distributions $\{P(A|D_i), P(A|\neg D_i)\}$ and $\{R(A|D_i), R(A|\neg D_i)\}$. The relationships in statement (F) add the benefit of giving emphasis to rules with greater support, which is ideally suited to the determining applications for which these techniques are intended. The method ends in step 710.

Data Storage Device

Such methods as discussed above may be implemented, for example, by operating the processor 103 of the client computer 102 shown in FIG. 1 to execute a sequence of machine-readable instructions. These instructions may reside in various types of data storage medium. In this respect, one aspect of the present invention concerns an article of manufacture, comprising a data storage medium tangibly embodying a program of machine-readable instructions executable by a digital data processor to perform method steps to extract desired data relationships from web site data.

Figure 8:
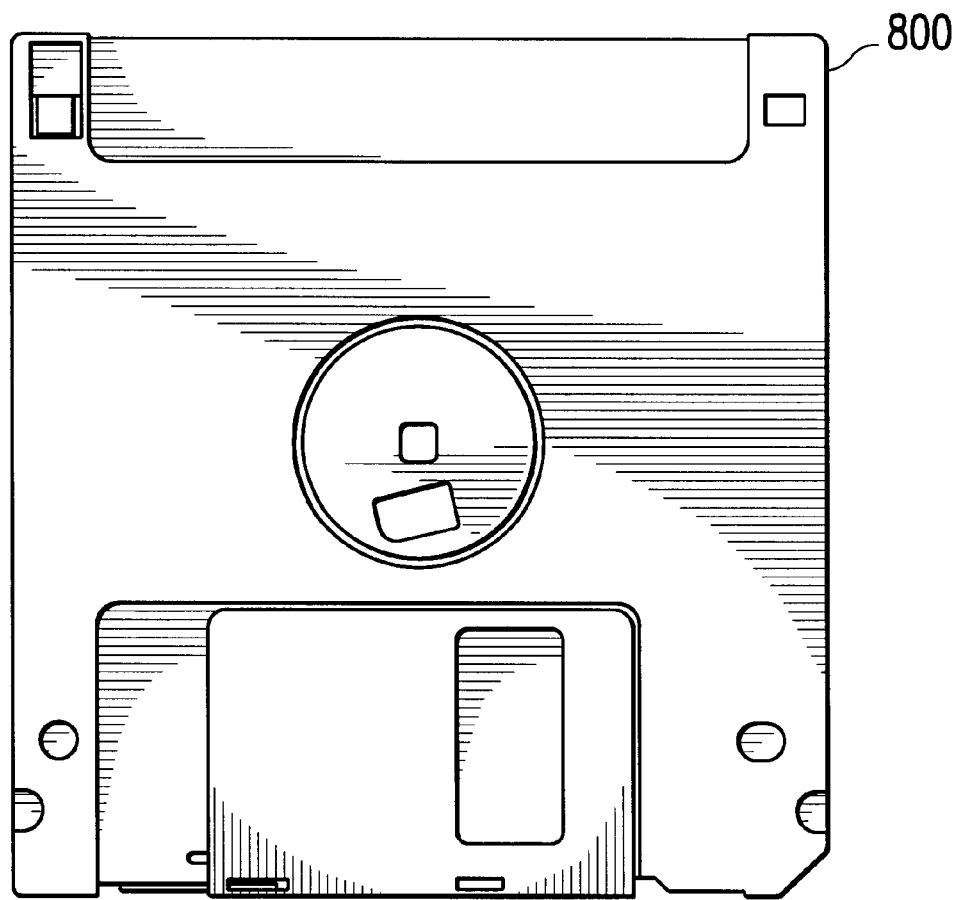
FIG. 8 is a perspective view of an exemplary signal-bearing medium in accordance with the invention.

This data storage medium may comprise, for example, RAM contained within the client computer 102. Alternatively, the instructions may be contained in another data storage medium, such as a magnetic data storage diskette 800 (FIG. 8). Whether contained in the client computer 102 or elsewhere, the instructions may instead be stored on another type of data storage medium such as DASD storage (e.g., a conventional "hard drive" or a RAID array), magnetic tape, electronic read-only memory (e.g., CD-ROM or WORM), optical storage device (e.g., WORM), paper "punch" cards, or other data storage media. In an illustrative embodiment of the invention, the machine-readable instructions may comprise lines of compiled C-type language code.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method for sorting data mining association rules, the method comprising:
   identifying statistically significant relationships within a cumulated distribution of data, the significant relationships represented by association rules; and
   separating meaningful association rules from unmeaningful association rules using an emulated distribution of the data as a reference, wherein said emulated distribution is based upon emulated events that are different than actual events.

2. The method recited in claim 1, separating meaningful association rules from unmeaningful association rules by sorting the rules by their support within the distribution of data.

3. The method recited in claim 1, separating meaningful association rules from unmeaningful association rules by sorting the rules by their confidence within the distribution of data.

4. The method recited in claim 2, wherein the association rules are sorted in sets of rules for different systems of events, where C represents an emulated system of events for a web site and B represents an actual system of events for the same web site data, and where if $K(P_{AC}:R_{AC})>K(P_{AB}:R_{AB})$, the association rules applied to the emulated system of events C have greater relevance then the association rules applied to the actual system of events B, and where P is a probability distribution for an association rule for the actual system of events, and R is an emulated support for an association rule for the emulated system of events, and wherein K is a constant.

5. The method recited in claim 4, wherein P is measured by an association rule's support in a respective system of events.

6. The method recited in claim 5, wherein $P_{AB}=P(A, B_1), P(A, B_2), \ldots P(A, B_n)$ and $R_{AB}=R(A, B_1), R(A, B_2) \ldots R(A, B_n)$, and $P_{AC}=P(A, C_1), P(A, C_2), \ldots P(A, B_n)$.

7. The method recited in claim 2, wherein the association rules are sorted in descending order of support.

8. The method recited in claim 7, where $P(A,B_1)/R(A,B_1), P(A,B_2)/R(A,B_2), \ldots P(A,B_n)/R(A,B_n)$, where B represents an event in an actual system of events, and where the association rules pertaining to the actual system of events have equal support as association rules pertaining to an emulated system of events if $P_{AB}/R_{AB}=1$, where P is a probability distribution for an association rule for the actual system of events, and R is an emulated support for an association rule for the emulated system of events, and where $P_{AB}$ has lesser support than $R_{AB}$ as $P_{AB} \rightarrow 0$ and $R_{AB} \rightarrow \infty$, and where $P_{AB}$ has greater support than $R_{AB}$ as $R_{AB} \rightarrow 0$ and $P_{AB} \rightarrow \infty$.

9. The method recited in claim 2, wherein the association rules are sorted in ascending order of support.

10. The method recited in claim 9, where $R(A,B_1)/P(A, B_1), R(A,B_2)/P(A,B_2), \ldots R(A,B_n)/P(A,B_n)$, where B represents an actual system of events, and where the association rules pertaining to the actual system of events have equal support as the association rules pertaining to an emulated system of events if $R_{AB}/P_{AB}=1$ where R is an emulated support for an association rule for an emulated system of events, and P is a probability distribution for an association rule for the actual system of events, and where $R_{AB}$ has lesser support than $P_{AB}$ as $R_{AB} \rightarrow 0$ and $P_{AB} \rightarrow \infty$, and where $R_{AB}$ has greater support than $P_{AB}$ as $P_{AB} \rightarrow 0$ and $R_{AB} \rightarrow \infty$.

11. The method recited in claim 2, wherein the association rules are further sorted where $P(A,B_1)\log(P(A,B_1)/R(A,B_1)), P(A,B_2)\log(P(A,B_2)/R(A,B_2)), \ldots, P(A,B_n)\log(P(A,B_n)/R(A,B_n))$.

12. The method recited in claim 8, wherein the association rules are farther sorted where $P(A,B_1)\log(P(A,B_1)/R(A,B_1)$, $P(A,B_2)\log(P(A,B_2)/R(A,B_2))$, ..., $P(A,B_n)\log(P(A,B_n)/R(A,B_n))$.

13. The method recited in claim 10, wherein the association rules are further sorted where $P(A,B_1)\log(P(A,B_1)/R(A,B_1)$, $P(A,B_2)\log(P(A,B_2)/R(A,B_2))$, ..., $P(A,B_n)\log(P(A,B_n)/R(A,B_n)$.

14. The method recited in claim 2, wherein event $D_1$ corresponds to a set of uniform resource locator data, and event $\neg D_1$ corresponds to all other sets of uniform resource locators not in set $D_1$, and where $D=\{D_1, D_2, \ldots, D_m\}$, where the uniform resource locator data sets do not comprise a system of events and $\{(P(A,D_i)/R(A,D_i) \div P(A,\neg D_i)/R(A,\neg D_i))/2\}$, $i=1, 2, \ldots, m$, where $i=1, 2, \ldots, m$.

15. The method recited in claim 14, sorting further comprising $\{P(A,D_i)\log(P(A,D_i)/R(A,D_i)) \div P(A,\neg D_i)\log(P(A,\neg D_i)/R(A,\neg D_i))\}$, $i=1,2, \ldots, m$, $\{P(A,D_i)/R(A,D_i)\}$, $i=1, 2, \ldots, m$.

16. The method recited in claim 2, wherein association rules having high levels of support compared to the emulated distribution are ranked highest, regardless of whether the association rules are highly supported in the uniform resource locator data as determined by P, and where P is a probability of an occurrence of the association rule.

17. The method recited in claim 16, wherein two association rules with identical P values are further sorted so that the rule with greater support in the emulated data is sorted higher than the rule with the lesser support.

18. A method for sorting data mining association rules, the method comprising:

identifying statistically significant relationships within a cumulated distribution of data, the significant relationships represented by association rules; and separating meaningful association rules from unmeaningful association rules using an emulated distribution of the data as a reference by sorting the rules by their support within the distribution of data, wherein the uniform resource locator data does not comprise a system of events and is sorted by m sets of uniform resource locator data, where $\{P(A,D_i)/R(A,D_i)\}$, $i=], 2, \ldots, m$, and $D_i$ corresponds to sets of uniform resource locator data 1 to m.

19. The method recited in claim 18, wherein the association rules are further sorted where $\{P(A,D_i)\log(P(A,D_i)/R(A,D_i))\}$, $i=1, 2, \ldots, m$.

20. A method for sorting data mining association rules, the method comprising:

identifying statistically significant relationships within a cumulated distribution of data, the significant relationships represented by association rules; and separating meaningful association rules from unmeaningful association rules using an emulated distribution of the data as a reference by sorting the rules by their confidence within the distribution of data, sorting of the association rules comprising ranking the rules by their confidence, where $\{P(A|D_i)/R(A|D_i)\}$, $i=1, 2, \ldots, m$, where P is a probability of an occurrence of an association rule, and where two association rules with identical P values are further sorted so that the rule with greater support in the emulated data is sorted higher than the rule with the lesser support.

21. The method recited in claim 20, wherein the association rules are further sorted where $\{P(A,D_i)\log(P(A|D_i)/R(A|D_i))\}$, $i=1, 2, \ldots, m$.

22. An article of manufacture comprising a data storage medium tangibly embodying a program of machine-readable instructions executable by a digital processing apparatus to perform a method for sorting data mining association rules, the method comprising:

identifying statistically significant relationships within a cumulated distribution of uniform resource locator data, the significant relationships represented by association rules; and separating meaningful association rules from unmeaningful association rules using an emulated distribution of the uniform resource locator data as a reference, wherein said emulated distribution is based upon emulated events that are different than actual events.

23. The article recited in claim 22, separating meaningful association rules from unmeaningful association rules by sorting the rules by their support within the distribution of uniform resource locator data.

24. The article recited in claim 22, separating meaningful association rules from unmeaningful association rules by sorting the rules by their confidence for support within the distribution of uniform resource locator data.

25. The article recited in claim 22, wherein the association rules are sorted in sets of rules for different systems of events, where C represents an emulated system of events for a web site and B represents an actual system of events for the same web site data, and where if $K(P_{AC}:R_{AC})>K(P_{AB}:R_{AB})$, the association rules applied to the emulated system of events C have greater relevance then the association rules applied to the actual system of events B, and where P is a probability distribution for an association rule for the actual system of events, and R is an emulated support for an association rule for the emulated system of events, and wherein K is a constant.

26. The article recited in claim 25, wherein P is measured by an association rule's support in a respective system of events.

27. The article recited in claim 22, wherein $P_{AB}=P(A, B_1)$, $P(A, B_2), \ldots P(A, B_n)$ and $R_{AB}=R(A, B_1), R(A, B_2) \ldots R(A, B_n)$, and $P_{AC}=P(A, C_1), P(A, C_2), \ldots P(A, B_n)$.

28. The article recited in claim 22, wherein the association rules are sorted in descending order of support.

29. The article recited in claim 22, where $P(A,B_1)/R(A,B_1)$, $P(A,B_2)/R(A,B_2), \ldots P(A,B_n)/R(A,B_n)$, where B represents an event in an actual system of events, and where the association rules pertaining to the actual system of events have equal support as association rules pertaining to an emulated system of events if $P_{AB}/R_{AB}=1$, where P is a probability distribution for an association rule for the actual system of events, and R is an emulated support for an association rule for the emulated system of events, and where $P_{AB}$ has lesser support than $R_{AB}$ as $P_{AB} \to 0$ and $R_{AB} \to \infty$, and where $P_{AB}$ has greater support than $R_{AB}$ as $R_{AB} \to 0$ and $P_{AB} \to \infty$.

30. The article recited in claim 22, wherein the association rules are sorted in ascending order of support.

31. The article recited in claim 22, where $R(A,B_1)/P(A,B_1)$, $R(A,B_2)/P(A,B_2), \ldots R(A,B_n)/P(A,B_n)$, where B represents an actual system of events, and where the association rules pertaining to the actual system of events have equal support as the association rules pertaining to an emulated system of events if $R_{AB}/P_{AB}=1$ where R is an emulated support for an association rule for an emulated system of events, and P is a probability distribution for an association rule for the actual system of events, and where $R_{AB}$ has lesser support than $P_{AB}$ as $R_{AB} \to 0$ and $P_{AB} \to \infty$, and where $R_{AB}$ has greater support than $P_{AB}$ as $P_{AB} \to 0$ and $R_{AB} \to \infty$.

32. The article recited in claim 22, wherein the association rules are further sorted where $P(A,B_1)\log(P(A,B_1)/R(A,B_1))$, $P(A,B_2)\log(P(A,B_2)/R(A,B_2))$, ..., $P(A,B_n)\log(P(A,B_n)/R(A,B_n))$.

33. An article recited in claim 29, wherein the association rules are further sorted where $P(A,B_1)\log(P(A,B_1)/R(A,B_1))$, $P(A,B_2)\log(P(A,B_2)/R(A,B_2))$, ..., $P(A,B_n)\log(P(A,B_n)/R(A,B_n))$.

34. An article recited in claim 31, wherein the association rules are further sorted where $P(A,B_1)\log(P(A,B_1)/R(A,B_1))$, $P(A,B_2)\log(P(A,B_2)/R(A,B_2))$, ..., $P(A,B_n)\log(P(A,B_n)/R(A,B_n))$.

35. The article recited in claim 22, wherein event $D_1$ corresponds to a set of uniform resource locator data, and event $\neg D_1$ corresponds to all other sets of uniform resource locators not in set $D_1$, and where $D=\{D_1, D_2, \ldots, D_m\}$, where the uniform resource locator data sets do not comprise a system of events and $\{(P(A,D_i)/R(A,D_i)+P(A,\neg D_i)/R(A,\neg D_i))/2\}$, $i=1, 2, \ldots, m$, where $i=1, 2, \ldots, m$.

36. The article recited in claim 22, the method steps further comprising: $\{(P(A,D_i)\log(P(A,D_i)/R(A,D_i))+P(A,\neg D_i)\log(P(A,\neg D_i)/R(A,\neg D_i))\}$, $i=1,2, \ldots, m$, $\{P(A,D_i)/R(A,D_i)\}$, $i=1, 2, \ldots, m$.

37. The article recited in claim 22, wherein association rules having high levels of support compared to the emulated distribution are ranked highest, regardless of whether the association rules are highly supported in the uniform resource locator data as determined by P, and where P is a probability of an occurrence of the association rule.

38. The article recited in claim 22, wherein two association rules with identical P values are further sorted so that the rule with greater support in the emulated data is sorted higher than the rule with the lesser support.

39. An article of manufacture comprising a data storage medium tangibly embodying a program of machine-readable instructions executable by a digital processing apparatus to perform a method for sorting data mining association rules, the method comprising:

identifying statistically significant relationships within a cumulated distribution of uniform resource locator data, the significant relationships represented by association rules; and separating meaningful association rules from unmeaningful association rules using an emulated distribution of the uniform resource locator data as a reference, wherein said emulated distribution is based upon emulated events that are different than actual events;

wherein the uniform resource located data does not comprise a system of events and is sorted by m sets of uniform resource locator data, where $\{P(A,D_i)/R(A,D_i)\}$, $i=1, 2, \ldots, m$, and $D_i$ corresponds to sets of uniform resource locator data 1 to m.

40. The article recited in claim 22, wherein the association rules are further sorted where $\{P(A,D_i)\log(P(A,D_i)/R(A,D_i))\}$, $i=1, 2, \ldots, m$.

41. An article of manufacture comprising a data storage medium tangibly embodying a program of machine-readable instructions executable by a digital processing apparatus to perform a method for sorting data mining association rules, the method comprising:

identifying statistically significant relationships within a cumulated distribution of uniform resource locator data, the significant relationships represented by association rules; and separating meaningful association rules from unmeaningful association rules using an emulated distribution of the uniform resource locator data as a reference, wherein said emulated distribution is based upon emulated events that are different than actual events;

sorting of the association rules comprising ranking the rules by their confidence, where $\{P(A\backslash D_i)/R(A\backslash D_i)\}$, $i=1, 2, \ldots, m$, where P is a probability of an occurrence of an association rule, and where two association rules with identical P values are further sorted so that the rule with greater support in the emulated data is sorted higher than the rule with the lesser support.

42. The article recited in claim 22, wherein the association rules are further sorted where $\{P(A,D_i)\log(P(A|D_i)/R(A|D_i))\}$, $i=1, 2, \ldots, m$.

43. An apparatus to sort data mining association rules, comprising:

a processor;

a database including URL data;

circuitry to communicatively couple the processor to the database;

storage communicatively accessible by the processor; the processor sorting mining association rules by:

identifying statistically significant relationships within a cumulated distribution of uniform resource locator data, the significant relationships represented by association rules; and separating meaningful association rules from unmeaningful association rules using an emulated distribution of the uniform resource locator data as a reference, wherein said emulated distribution is based upon emulated events that are different than actual events.

44. The apparatus recited in claim 43, the processor further sorting by: separating meaningful association rules from unmeaningful association rules by sorting the rules by their support within the distribution of uniform resource locator data.

45. The apparatus recited in claim 43, separating meaningful association rules from unmeaningful association rules by sorting the rules by their confidence for support within the distribution of uniform resource locator data.

46. The apparatus recited in claim 43, wherein the association rules are sorted in sets of rules for different systems of events, where C represents an emulated system of events for a web site and B represents an actual system of events for the same web site data, and where if $K(P_{AC}:R_{AC})>K(P_{AB}:R_{AB})$, the association rules applied to the emulated system of events C have greater relevance then the association rules applied to the actual system of events B, and where P is a probability distribution for an association rule for the actual system of events, and R is an emulated support for an association rule for the emulated system of events, and wherein K is a constant.

47. The apparatus recited in claim 43, wherein P is measured by an association rule's support in a respective system of events.

48. The apparatus recited in claim 43, wherein $P_{AB}=P(A, B_1)$, $P(A, B_2)$, ... $P(A, B_n)$ and $R_{AB}=R(A, B_1)$, $R(A, B_2)$ ... $R(A, B_n)$, and $P_{AC}=P(A, C_1)$, $P(A, C_2)$, ... $P(A, B_n)$.

49. The apparatus recited in claim 43, wherein the association rules are sorted in descending order of support.

50. The apparatus recited in claim 43, where $P(A,B_1)/R(A,B_1)$, $P(A,B_2)/R(A,B_2)$, ... $P(A,B_n)/R(A,B_n)$, where B represents an event in an actual system of events, and where the association rules pertaining to the actual system of events have equal support as association rules pertaining to an emulated system of events if $P_{AB}/R_{AB}=1$, where P is a probability, distribution for an association rule for the actual system of events, and R is an emulated support for an association rule for the emulated system of events, and where $P_{AB}$ has lesser support than $R_{AB}$ as $P_{AB}\rightarrow 0$ and $R_{AB}\rightarrow\infty$, and where $P_{AB}$ has greater support than $R_{AB}$ as $R_{AB}\rightarrow 0$ and $P_{AB}\rightarrow\infty$.

51. The apparatus recited in claim 43, wherein the association rules are sorted in ascending order of support.

52. The apparatus recited in claim 43, where $R(A,B_1)/P(A,B_1)$, $R(A,B_2)/P(A,B_2)$, ... $R(A,B_n)/P(A,B_n)$, where B represents an actual system of events, and where the association rules pertaining to the actual system of events have equal support as the association rules pertaining to an emulated system of events if $R_{AB}/P_{AB}=1$ where R is an emulated support for an association rule for an emulated system of events, and P is a probability distribution for an association rule for the actual system of events, and where $R_{AB}$ has lesser support than $P_{AB}$ as $R_{AB} \to 0$ and $P_{AB} \to \infty$, and where $R_{AB}$ has greater support than $P_{AB}$ as $P_{AB} \to 0$ and $R_{AB} \to \infty$.

53. The apparatus recited in claim 43, wherein the association rules are further sorted where $P(A,B_1)\log(P(A,B_1)/R(A,B_1))$, $P(A,B_2)\log(P(A,B_2)/R(A,B_2))$, ..., $P(A,B_n)\log(P(A,B_n)/R(A,B_n))$.

54. The apparatus recited in claim 50, wherein the association rules are further sorted where $P(A, B_1)\log(P(A, B_1)/R(A,B_1))$, $P(A, B_2)\log(P(A, B_2)/R(A, B_2))$, ..., $P(A, B_n)\log(P(A, B_n)/R(A, B_n))$.

55. The apparatus recited in claim 52, wherein the association rules are further sorted where $P(A, B_1)\log(P(A, B_1)/R(A,B_1))$, $P(A, B_2)\log(P(A, B_2)/R(A, B_2))$, ..., $P(A, B_n)\log(P(A, B_n)/R(A, B_n))$.

56. The apparatus recited in claim 43, wherein event $D_1$ corresponds to a set of uniform resource locator data, and event $\neg D_1$ corresponds to all other sets of uniform resource locators not in set $D_1$, and where $D=\{D_1, D_2, \ldots, D_m\}$, where the uniform resource locator data sets do not comprise a system of events and $\{(P(A,D_i)/R(A,D_i) \div P(A,\neg D_i)/R(A,\neg D_i))/2\}$, i=1, 2, ..., m, where i=1, 2, ..., m.

57. The apparatus recited in claim 43, sorting further comprising $\{P(A,D_i)\log(P(A,D_i)/R(A,D_i)) \div P(A,\neg D_i)\log(P(A,\neg D_i)/R(A,\neg D_i))\}$, i =1, 2, ..., m, $\{P(A,D_i)/R(A,D_i)\}$, i=1, 2, ..., m.

58. The apparatus recited in claim 43, wherein association rules having high levels of support compared to the emulated baseline reference distribution are ranked highest, regardless of whether the association rules are highly supported in the uniform resource locator data as determined by P, and where P is a probability of an occurrence of the association rule.

59. The apparatus recited in claim 43, wherein two association rules with identical P values are further sorted so that the rule with greater support in the emulated data is sorted higher than the rule with the lesser support.

60. An apparatus to sort data mining association rules, comprising:
a processor;
a database including URL data;
circuitry to communicatively couple the processor to the database;
storage communicatively accessible by the processor; the processor sorting mining association rules by:
identifying statistically significant relationships within a cumulated distribution of uniform resource locator data, the significant relationships represented by association rules; and
separating meaningful association rules from unmeaningful association rules using an emulated distribution of the uniform resource locator data as a reference, wherein said emulated distribution is based upon emulated events that are different than actual events;
where the uniform resource locator data does not comprise a system of events and is sorted by m sets of uniform resource locator data, where $\{P(A,D_i)/R(A, D_i)\}$, i=1, 2, ..., m, and $D_i$ corresponds to sets of uniform resource data 1 to m.

61. The apparatus recited in claim 43, wherein the association rules are further sorted where $\{P(A,D_i)\log(P(A,D_i)/R(A,D_i))\}$, i=1, 2, ..., m.

62. An apparatus to sort data mining association rules, comprising:
a processor;
a database including URL data;
circuitry to communicatively couple the processor to the database;
storage communicatively accessible by the processor; the processor sorting mining association rules by:
identifying statistically significant relationships within a cumulated distribution of uniform resource locator data, the significant relationships represented by association rules; and
separating meaningful association rules from unmeaningful association rules using an emulated distribution of the uniform resource locator data as a reference, wherein said emulated distribution is based upon emulated events that are different than actual events;
sorting of the association rules comprising ranking the rules by their confidence, where $\{P(A\backslash D_i)/R(A\backslash D_i)\}$, i=1,2, ..., m, where P is a probability of an occurrence of an association rule, and where two association rules with identical P values are further sorted higher than the rule with the lesser support.

63. The apparatus recited in claim 43, wherein the association rules are further sorted where $\{P(A,D_i)\log(P(A|D_i)/R(A|D_i))\}$, i =1, 2, ..., m.

64. An apparatus for sorting data mining association rules, comprising:
means for storing URL data;
means for processing the URL data by:
identifying statistically significant relationships within a cumulated distribution of uniform resource locator data, the significant relationships represented by association rules; and
separating meaningful association rules from unmeaningful association rules using an emulated distribution of the uniform resource locator data as a reference, wherein said emulated distribution is based upon emulated events that are different than actual events.

65. The apparatus recited in claim 64, the processing means further sorting data by separating meaningful association rules from unmeaningful association rules by sorting the rules by their support within the distribution of uniform resource locator data.

66. The apparatus recited in claim 64, the processing means further sorting data by separating meaningful association rules from unmeaningful association rules by sorting the rules by their confidence for support within the distribution of uniform resource locator data.

67. The apparatus recited in claim 64, wherein the association rules are sorted in sets of rules for different systems of events, where C represents an emulated system of events for a web site and B represents an actual system of events for the same web site data, and where if $K(P_{AC}:R_{AC}) > K(P_{AB}:R_{AB})$, the association rules applied to the emulated system of events C have greater relevance then the association rules applied to the actual system of events B, and where P is a probability distribution for an association rule for the actual system of events, and R is an emulated support for an association rule for the emulated system of events, and wherein K is a constant.

68. The apparatus recited in claim 64, wherein P is measured by an association rule's support in a respective system of events.

69. The apparatus recited in claim 64, wherein $P_{AB}=P(A, B_1), P(A, B_2), \ldots P(A, B_n)$ and $R_{AB}=R(A, B_1), R(A, B_2) \ldots R(A, B_n)$, and $P_{AC}=P(A, C_1), P(A, C_2), \ldots P(A, B_n)$.

* * * * *